United States Patent [19]
Battrel

[11] Patent Number: 6,139,253
[45] Date of Patent: Oct. 31, 2000

[54] LIFTING DEVICE FOR TRANSPORTING DISK STACKS

[75] Inventor: Joel Battrel, Ardres, France

[73] Assignee: Cuno, Inc.

[21] Appl. No.: 09/133,013

[22] Filed: Aug. 12, 1998

[51] Int. Cl.[7] .................................................. B25J 15/00
[52] U.S. Cl. ...................... 414/796.9; 414/739; 414/753; 414/801; 294/115
[58] Field of Search ............................. 414/796.9, 796.5, 414/789.9, 801, 739, 753; 294/86.29, 115

[56] References Cited

U.S. PATENT DOCUMENTS

| | | |
|---|---|---|
| 1,630,456 | 5/1927 | Wehr . |
| 2,014,807 | 9/1935 | Keyzer . |
| 2,382,227 | 8/1945 | Hopkins et al. . |
| 2,951,725 | 9/1960 | St. Jean . |
| 3,212,650 | 10/1965 | Sharpe et al. . |
| 4,676,396 | 6/1987 | Mamolou . |
| 4,796,779 | 1/1989 | Mamolou . |
| 4,905,870 | 3/1990 | Mamolou . |
| 5,056,842 | 10/1991 | Lindenberg et al. . |
| 5,184,860 | 2/1993 | Bouillon et al. . |
| 5,513,889 | 5/1996 | Fithen et al. . |
| 5,607,584 | 3/1997 | Swiatek et al. . |

FOREIGN PATENT DOCUMENTS

| | | |
|---|---|---|
| 2 460 154 | 1/1981 | France . |
| 91 07 271 U | 7/1991 | Germany . |
| WO 93/09054 | 5/1993 | WIPO . |

*Primary Examiner*—Douglas Hess
*Attorney, Agent, or Firm*—Cummings + Lockwood

[57] ABSTRACT

The present application utilizes a lifting apparatus for lifting disk stacks, the lifting apparatus includes a structural member having a central guide bore and at least three connecting members operatively positioned about the outer periphery thereof; a central guide member, operatively positioned relative to the central guide bore of the structural member and operatively connected thereto; a ring member, operatively positioned on the central guide member, and having at least three connecting members operatively positioned thereon; at least three linking means, operatively connected to each of the structural member connecting members and to each of the ring member connecting members, for providing movement of the ring member relative to the structural member; and a gripping member, operatively connected to each of the linking members and to each of the structural member connecting members for interacting with at least one disk stack such that at least one disk stack is transported to another position. Systems and methods for utilizing the lifting device are also disclosed.

31 Claims, 3 Drawing Sheets

LIFTING DEVICE FOR TRANSPORTING DISK STACKS

BACKGROUND OF THE INVENTION

The present application relates to systems, apparatuses and methods including a lifting device for transporting disk stacks, such as removable cell-type filters through which fluids are passed for filtration, more particularly, to systems, apparatuses and methods including a lifting device for easily, safely and effectively transporting disk stacks, such as removable cell-type filter cartridges, during the removal of the cartridge or cartridges from a removable cell-type filter cartridge assembly and, most particularly, to an adjustable lifting device for easily, safely and effectively installing and removing disk stacks, such as cell-type filter cartridges, from a removable filter cartridge housing.

Cell-type filter cartridges have long been known and have been increasingly used in a variety of filtration situations. These types of filter cartridges are typically fabricated from individual cells generally having two layers of filter media separated from each other. Liquid typically flows from the outside of the filter medium into the space between the layers of the filter media toward the central portion of the cell. A significant advantage to cell-type filter cartridges is that the surface area of filter material is quite large when compared to the total volume of an assembled cell-type filter cartridge.

Disposed between each filter medium is a separator which is typically formed in the shape of disks having ribs radially extending from the central aperture in a spoke-like pattern. In addition to separating the two layers of filter media, it provides for fluid flow from the filter media toward the central aperture of the filter media.

The separator disk conventionally has stiffening members formed at the central aperture of the cell which are attached to a plurality of separating ribs to provide a rigid, box-like structure sufficient to impart substantial cantilever strength to the ribs. Further, one of the stiffening disks is conventionally positioned proximate the ends of the separator ribs in order to act as a loadbearing surface to prevent media intrusion of the filtering medium and to prevent blocking the area of the flow path with the filtered liquid. Accordingly, one distinct advantage in this type of separator is that during backwashing or reverse flow (i.e., fluid flow from the central aperture of the filter cell out toward the surface of the filter medium) damage to the filter media is minimized.

Filter cartridges use a variety of filter media for filtering many fluids. Examples of such media and uses may be found, for example, in U.S. Pat. No. 4,617,128 "Particulate Filter Aid, Filter Bed Process" dated Oct. 14, 1986, to Ostreicher; U.S. Pat. No. 4,309,247 "Filter and Method of Making Same" dated Jan. 5, 1982, to Hou et al.; U.S. Pat. No. 4,305,782 "Filter and Method of Making Same" dated Dec. 15, 1981, to Ostreicher et al.; U.S. Pat. No. 4,007,113 "Particulate Filter Medium and Process" dated Feb. 8, 1977, to Ostreicher; and U.S. Pat. No. 4,007,114 "Fibrous Filter Medium and Process" dated Feb. 8, 1977, to Ostreicher. All of the foregoing patents are incorporated herein by reference.

Use of a cell-type filter cartridge may be also found in U.S. Pat. No. 4,361,486 "Filter Media, Method for Oxidizing and Removing Soluble Iron, Method for Removing Inactivating Microorganisms and Particulate Filter Aid" issued Nov. 30, 1982, to Hou et al. which is incorporated herein by reference.

A process for manufacturing filter cells is described in U.S. Pat. No. 4,347,208 "Method of Making Filter Cell Having Sealed Periphery" issued Aug. 31, 1982, to Southall, the disclosure of which is herein incorporated by reference. In this patent, a filter cell cartridge is described which comprises a plurality of filter cells. Each of the filter cells is comprised of filter media having a conical separator therebetween with the periphery or edges of the filter cell being held together and sealed by an injection-molded flange.

A method for disposing a netting or mesh on the outside of the filter material is disclosed in U.S. Pat. No. 4,881,313 "Method of Forming a Cell Filter With an Exposed Surface" issued to Artinyan et al., the disclosure of which is herein incorporated by reference. In this patent, the surface area of filter exposed to unfiltered fluid has disposed thereon a netting thereby preventing flaking, cracking and the like of filter media during backflow or cleaning operations. The netting is secured to the cell by a molded circumferential retainer and a circumferential centrally disposed ring.

Generally, all of the aforementioned filter cartridges perform as anticipated during normal operating conditions. As can be expected after extended use, the filtering capacity of the filter media diminishes accordingly. Once the filter performance has diminished, the filter cartridges are typically replaced by grasping the periphery or edge of the uppermost filter cell, and then carefully lifting the attached filters away from the filter housing. This method relies on the strength of the individual wet cells, as well as that of the bands which interconnect the multiple filter cells, to prevent any one of the attached filter cells from breaking apart. Alternatively, if the construction of the filter housing permits, the bottom filter may be grasped around its periphery and then removed by carefully lifting the cartridge up and out of the filter housing. Both of the aforementioned methods are problematic because of the increased weight of a wet filter cartridge as compared to the weight of a dry filter cartridge. This increased load is generally concentrated toward the center of the cartridge, thus resulting in the likelihood of the cartridge separating during the lifting operation.

A wet filter cartridge that breaks during removal from a filter housing causes several problems. Primarily, if the cartridge breaks while still in the vicinity of the housing, the particulate matter removed by the filters may re-enter the housing, thus requiring additional cleaning operations in and around the housing.

It is known to provide handles for lifting and carrying bulky items such as filter cartridge assemblies including handles operatively disposed on the filter cell cartridge, as disclosed in U.S. Pat. No. 5,607,584 assigned to the assignee of the present application, the disclosure of which is hereby incorporated by reference. However, the prior art does not provide means for removing a filter cartridge from a location, after removal of the filter cartridge housing, without an operator physically lifting the filter cartridge from its operating position and manually transporting the filter cartridge to a location removed from the operating position. Because the manual removal of the cartridge from the operating position often involves the use of stairs by an operator while transporting the heavy cartridge, as well as possibly contacting toxic substances on the exterior portion of the filter cartridges, systems including a lifting device and methods of using the lifting device that would eliminate the need for an operator to manually transport the cell-type filter cartridges and to reduce the overall time needed to remove and replace the cell-type filter cartridges is desirable Thus, there is a need for systems, including a lifting device, and methods for easily, safely and effectively removing used disk stacks, such as cell-type filter cartridges, used in filtration operations from their operative position in housings after the housing enclosure has been removed. Such systems and methods should avoid manual lifting and transporting of the disk stacks. Such systems and methods should eliminate or at least minimize direct contact between operators and the cell-type filter disks in order to minimize operator contact with possible dangerous or toxic substances and minimum contaminating the environment of the filter housing with slippery, toxic or dangerous material that may have been collected on the outer surfaces of the cell-type filter disk. Such systems and methods should eliminate or endeavor to minimize any heavy lifting required by an operator, thereby contributing to a safer operating environment. Such systems and methods should endeavor to reduce the overall time required to change cell-type filter cartridges and thereby reduce the downtime attributable thereto. Such systems and methods should eliminate the requirement for operators to manually transport or move the cell-type filter disk up or down stairs. Such systems and methods should provide for cleaner, less contaminated filter surfaces when new replacement cell-type filter cartridges are positioned in filter housings. Such systems and methods should facilitate the placement of the used cell-type filter cartridges in waste enclosures.

SUMMARY OF THE INVENTION

An object of the present application is to provide systems, including lifting devices, and methods that eliminate the manual transportation and disposal of used cell-type filter cartridges.

Another object of the present application is to provide systems, including a lifting device, and methods for easily, safely and effectively transporting and disposing of used cell-type filter cartridges from an initial operating position in a filter housing unit to a remote location.

Still another object of the present application is to provide systems, including a lifting device, and methods for easily, safely and effectively loading a new cell-type filter cartridges from a remote location to an initial operating position in a filter housing unit.

A further object of the present application is to provide systems, including a lifting device, and methods that minimize contact by an operator with possible toxic materials contained on the used cell-type filter cartridges.

Yet another object of the present application is to provide systems, including a lifting device, and methods for minimizing contamination of the filter housing environment.

Yet a further object of the present application is to provide a system, including a lifting device, and methods for reducing the overall time required to change cell-type filter cartridges in a filter housing.

Yet another object of the present application is to provide systems and methods for eliminating the requirement that an operator use steps/stairs to transport manually used cell-type filter cartridges during loading and unloading cell-type filter cartridges from a filter housing, thereby reducing possible operator injury.

In accordance with these and further objects, one aspect of the present application includes an apparatus for handling disk stacks, the apparatus comprising: a structural member including a central guide bore and at least three connecting means operatively connected thereto; a central guide member, operatively positioned relative to the central guide bore of the structural member and operatively connected thereto; a ring member, operatively positioned on the central guide member, and having at least three connecting members operatively connected thereto; at least three linking means, operatively connected to each of the structural member connecting means and to each of the ring member connecting means, for providing movement of the ring member relative to the structural member; and at least three gripping members, operatively connected to each of the linking means and to each of the structural member connecting means, for interacting with at least one disk stack such that at least one disk stack is transported from a first position to another position.

Another aspect of the present application includes a system for lifting and transporting disk stacks comprising: a structural member including a central guide bore and at least three connecting means operatively positioned about the outer periphery thereof; a central guide member, operatively positioned relative to the central guide bore of the structural member and operatively connected thereto; a ring member, operatively positioned relative the central guide member, and having at least three connecting members operatively positioned thereon; linking means, operatively connected to each of the structural member connecting means and to each of the ring member connecting means, for providing movement of the ring member relative to the structural member; and a gripping member, operatively connected to each linking means and to each of the structural member connecting means, for interacting with at least one disk stack; means, operatively connected to the ring member, for vertically raising the lifting member such that at least one disk stack is transported to another position.

Still another aspect of the present application includes a method for lifting disk stacks from an initial position and transporting the disk stacks to a remote location, the method comprising the steps of: providing at least one disk to be moved; operatively connecting a lifting device to the at least one disk, the lifting device comprising: a structural member including a central guide bore and at least three connecting means operatively positioned about the outer periphery thereof; a central guide member, operatively positioned relative to the central guide bore of the structural member and operatively connected thereto; a ring member, operatively positioned on the central guide member, and having at least three connecting members operatively positioned thereon; linking means, operatively connected to each of the structural member connecting means and to each of the ring member connecting means, for moving the ring member relative to the structural member; and a gripping member, operatively connected to each linking means, for interacting with at least one disk stack; providing means for engaging the disk with the gripping members; vertically raising the at least one disk stack; and relocating the at least one disk stack from an initial position to another position.

Other objects and advantages of the application will be apparent from the following description, the accompanying drawings and the appended claims.

DETAILED DESCRIPTION OF THE EMBODIMENTS

Figure 1:
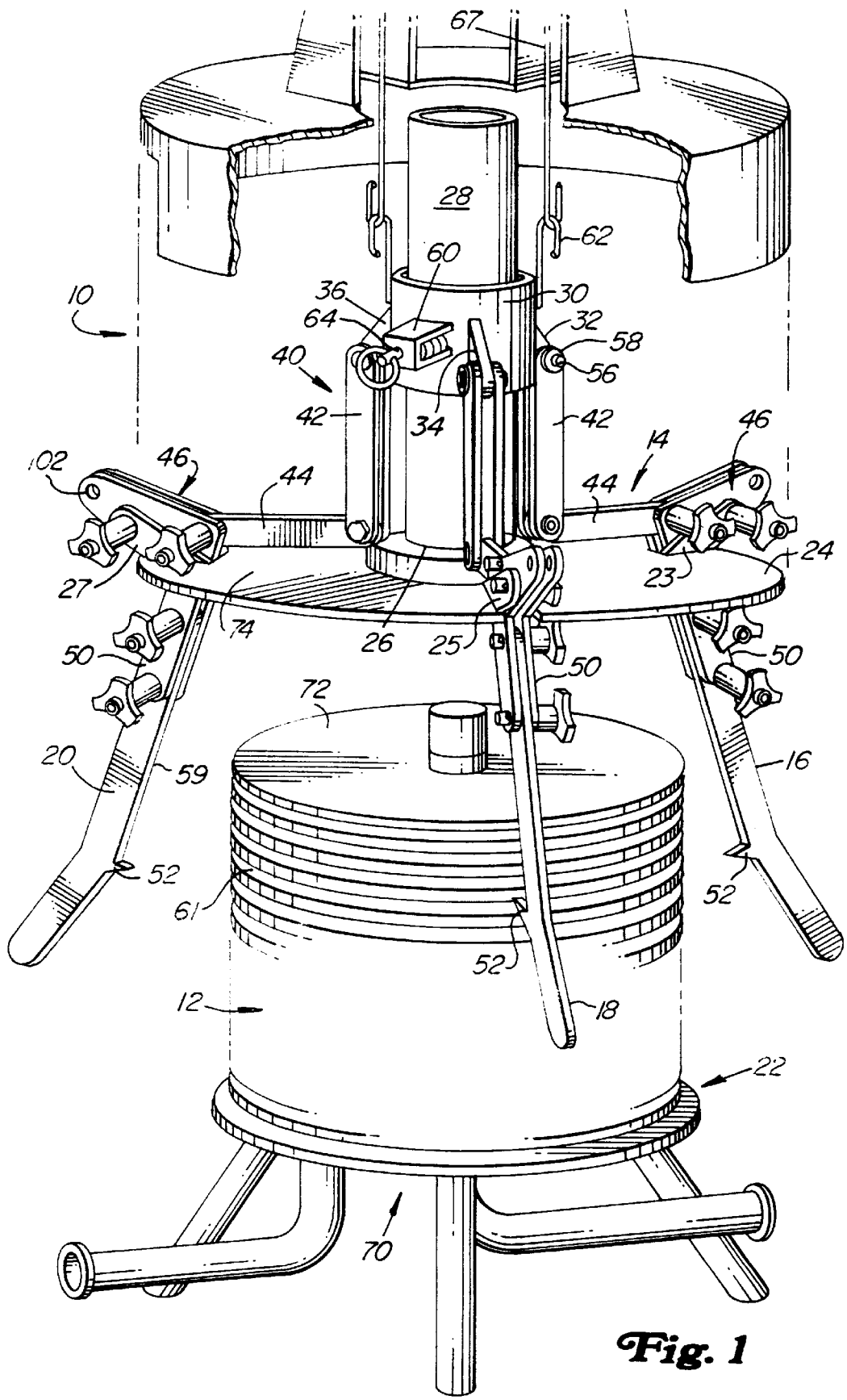
FIG. 1 is a perspective view of a representative system used with the methods of the present application showing the lifting device in the open position suspended from a hoist over a disk stack or representative twelve-inch-diameter cell-type filter cartridge mounted on a housing base.

As shown in FIGS. 1–4, the system disclosed in the present application comprises systems 10, including a lifting device, and methods for lifting and transporting a cell-type filter assembly or a plurality of cell-type filter cartridge assemblies 12 from an initial operating position to a remote location such as, for example, a waste container. The system 10 includes a lifting device 14 that uses machine power, such as, for example, electric powered or other host, to eliminate the fastidious and dangerous manual lifting operation, thereby increasing the safety, ease of operation and productivity of the operator utilizing the systems and methods of the present application. In normal operation, the lifting device includes a security cover for protecting an operator from the moving parts of the device.

One key component of the systems 10 and methods of the present application is the unique apparatus or lifting device 14 which mechanically locks at least three gripping members 16, 18, 20 into position about a plurality of used cell-type filter cartridges 10 and then, with the use of an overhead hoist (not shown) or crane used or other means for lifting weights of up to and exceeding about 50 lbs or about 25 kg, transporting the cell-type filter cartridges 10 from an initial operating position 22 to a remote location (not shown).

Figure 2:
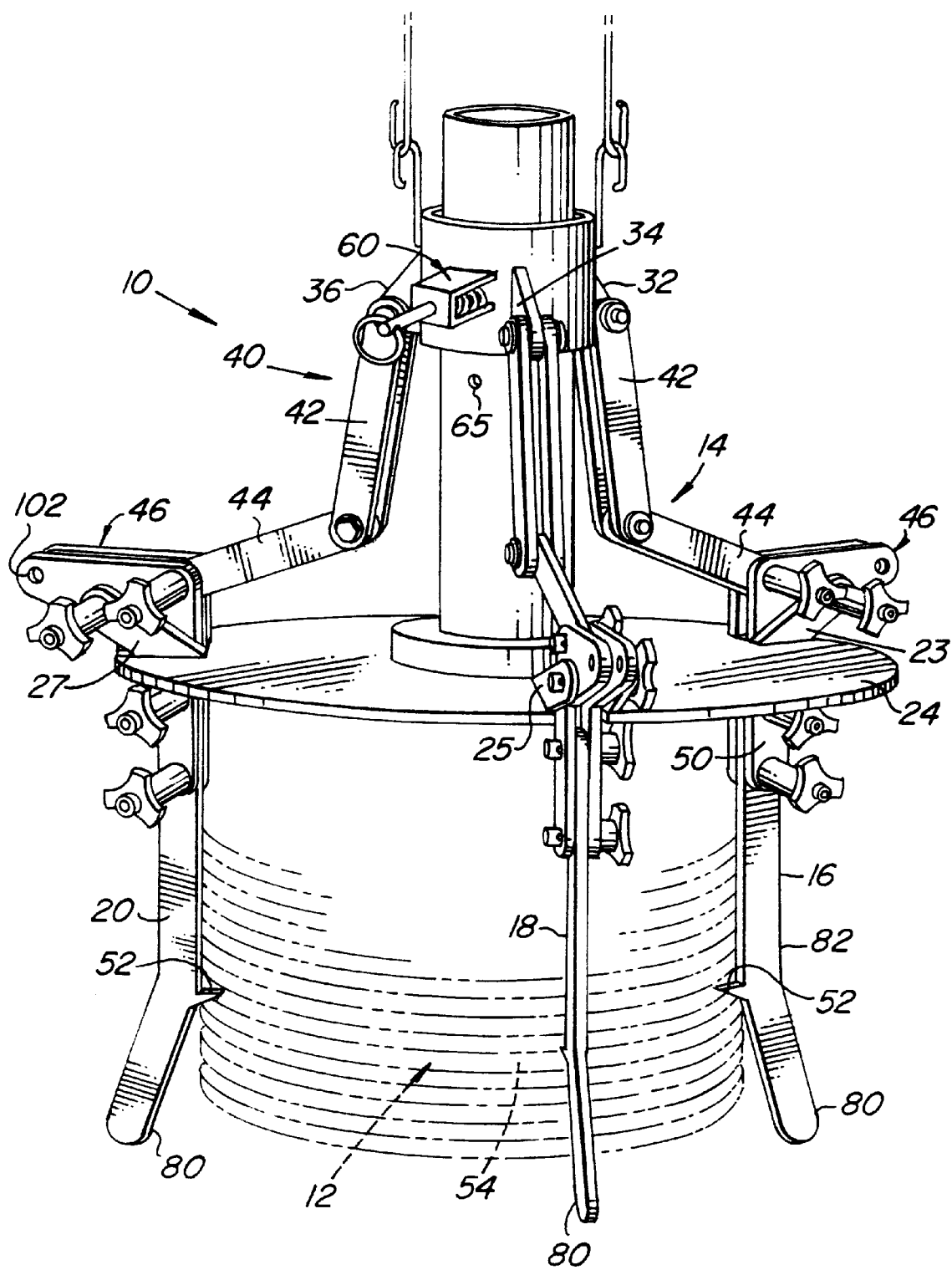
FIG. 2 is a side perspective view illustrating the lifting device of FIG. 1 positioned on a representative twelve-inch-diameter cell-type filter cartridge with a lifting device in the closed position.

The lifting device 14 of the present application includes, as shown in FIG. 1, a top structural member 24 (the top structural member is shaped according to the cross-sectional shape of the cell-type filter cartridges, presently preferably round, as illustrated), having a central guide bore 26 and three connecting members 23, 25, 27 for operatively connecting the gripping members 16, 18, 20 thereto. A central guide member 28, preferably hollow, is operatively connected to the top structural member 24. A ring member 30 having at least three connecting means 32, 34, 36, operatively positioned thereon, is operatively positioned over the central guide member 28 and is operatively movable with respect thereto. Linking means 40, presently preferably, comprising a plurality of linking members 42, 44, 46, operatively connects each ring member connecting means 32, 34, 36 with each top structural member connecting means 23, 25, 27. Each linking means 40, presently preferably, comprises at least two elongated linking members 42, 44 and an angled linking member 46. The angled linking member 46 is, presently preferably, utilized to connect each linking means 40 from each ring connecting means 32, 34, 36 to the top structural member connecting means 23, 25, 27 and to operatively connect each gripping member 16, 18, 20 to one end 50 of each linking means 40. Each gripping member is operatively connected to the angled linking member via the top structural member connecting means 32, 34, 36 such that each gripping member 16, 18, 20 is movable between an open and a closed position, as shown in FIGS. 1 and 2. These gripping members 16, 18, 20 each include a protrusion 52 operatively positioned along the length thereof for engaging the cell-type filter cartridge 10 by being positioned under the outer peripheral edge 54 circumscribing the cartridge 12 such that at least a portion of the weight of the filter cartridge assembly is supported thereby.

As best shown in FIG. 2, the first linking member 42 is, presently preferably, operatively connected to each ring member connecting means 32, 34, 36. The first linking member 42 of the linking means 40 is connected to the ring connecting means 36 by means which provides for the rotation and movement of the linking means 40 relative to the ring connecting means 36 such as, for example, a bolt 56 and nut 58, a rivet or other means which would allow for the performance of the functional pivoting of the linking means 40 with respect to the ring member connecting means 32, 34, 36 and the movement of the ring member 30 with respect to the central guide 28. The linking means 40, presently preferably, includes at least two linking members 42, 44 and the angled linking member 46, with the linking member 42 and the angled linking member 46 each comprising two identical separate pieces. Each angled linking member 46 is operatively connected to each second linking member 44 and to each gripping member 16, 18, 20. The angled linking member 46 is operatively connected to the second linking member 44 and to each top structural member connecting means 23, 25, 27 such that the angled linking member can pivot with respect to the top structural member 24. The protrusion 52 of each gripping member 16, 18, 20 is operatively positioned on the inner surface 59 thereof for engagement with slots 61 in the cell-type filter cartridge assembly 12, as mentioned above.

Locking means, such as, for example, a locking device 60, such as, for example, the type manufactured by Erwin Halder KG, Achstetten-Bronnen, Germany, including position maintaining means, such as, for example, a spring return pin 64, is operatively connected to the ring member 30 such that the ring member 30 can be locked in, presently preferably, the open and the closed positions, as will be explained below.

Connecting means 62, such as, for example, metal hooks or similar devices or other means capable of performing the function, are operatively connected to the ring member 30. These connecting means 62 are effective for interacting with a hoist link 67 or other equivalent device for operatively connecting the ring member 30 to a hoist or crane (not shown) or other lifting means or apparatus useful for vertically manipulating the position of the lifting device 14, such as, for example, manually manipulating the lifting device via handles.

As shown in FIG. 1, one representative lifting device 14, locked in the open position, is operatively connected to a hoist and positioned above a representative twelve (12) inch diameter cell-type filter cartridge 12. FIG. 2 shows the lifting device 14 in the closed position operatively positioned on top of cell-type filter cartridge 12. To move to this position, an operator would lower the lifting device 14 and position it on to the cell-type filter device 12, as is known to those skilled in the art. Once the lifting device 14 is positioned on the cell-type filter cartridge 12, the position locking device 60 is manipulated (such as, for example, removing a pin from an aperture 65 found in the central guide member 28) so that the lifting device 14 is no longer retained in the open position but the ring 30 is free to move away from the top structural member 24, thereby rotating the gripping members 16, 18, 20 into contact with the cell-type filter cartridge 12.

During the relocation of a wet, heavy cell-type filter cartridge from an initial position on a support 70, the system 10 of the present application includes a hoist or crane means (not shown) operatively connected to the lifting device 14 via the illustrated hoist link 67 or via means, such as, for example, handles (not shown) connected to the ring member 30 for manual operation. As shown in FIGS. 1–2, an operator manipulates the hoist and positions the lifting device 14, locked in the open position, immediately above the cell-type filter cartridge 12 to be removed, after the outer housing (not shown) of the filtration device support 70 has been removed exposing the cell-type filtration cartridge 12. The operator lowers the lifting device 14 utilizing the hoist or the like until the lifting device contacts the upper portion 72 of the cell-type filter cartridge. Once in position the operator disengages the open position locking means 60 thereby allowing the ring member 30 to slide along the center guide 28 and, once the gripping members 16, 18, 20 are contacting the outer periphery of the cartridge 12, manipulates the hoist or other device to exert a lifting force on the ring member 30 thereby moving the ring member 30 away from the top structural member 24. The lifting force moves the ring member 30 upward away from the top structural member 24 and, through the three linking means 40, rotates the three gripping members 16, 18, 20 inwardly into contact with the side of the cell-type filter cartridge, as described above.

As the operator provides lifting force via the hoist to the ring member 30, the ring member slides relative the hollow central guide 28, causing the gripping members 16, 18, 20 to rotate toward the central guide 28 and into contact with the cell-type cartridge assembly 12 such that each protrusion 52 engages a slot 61 between the individual filter cells. During the tensioning of the hoist link 64 or the like, the ring member 30 moves vertically away from the top structural member 24. The first linking member 42 of the linking means 60 rotates outwardly away from the central guide member 28 and the second linking member 44 of the linking means 40 rotates up and away from the top surface 74 of the top structural member 24. Further, the angled linking member 46 rotates downwardly and inwardly toward the central guide member 38 with respect to the top structural member connecting means 23, 25, 27 such that the gripping members 16, 18, 20 operatively connected thereto engage the cell-type filter cartridge, as shown in FIG. 2.

It should be noted that the weight of the assembly, including the wet cell-type filter cartridge 12 and the lifting device 14, suspended from the hoist is mechanically transformed into a gripping force whereby the gripping force is applied to the cartridge by the three (3) gripping members 16, 18, 20. The higher the total weight of the disk stack or cartridge 12, the stronger the force transferred by the lifting device 14 to the gripping members 16, 18, 20 and ultimately to the disk stack or cartridge 12.

At this point, once the full weight of the cell-type filter cartridge 12 is being supported by the lifting device 14 via the hoist or other means, the lifting device may be locked in its closed position via the locking means 60 positioned on the ring member 30 using an aperture or equivalent means (not shown) formed in the ring member 30 and the central guide means 38.

Once the gripping members 16, 18, 20 are securely positioned relative to the cell-type filter cartridge 12, the operator manipulates the hoist such that the cartridge(s) is (are) moved upward and away from the initial operating position on the base of the housing, as shown in FIG. 2. The operator then manipulates the hoist or crane to move the cell-type filter cartridge to a remote location or to place it in a waste disposal container (not shown).

Once the cell-type filter cartridge has been placed on a supporting surface, in order to release the lifting device from contact therewith, the operator reduces the lifting force on the support ring to zero force allowing the hoist link 67 to move downward toward the plate 24 out of contact with the connecting means 62 and then releases the locking means 60 allowing the support ring 30 to slide downwardly toward the top structural member 24 and to lock in the open position, such as, for example, engaging aperture 65. Once this has occurred, the operator is free to move the lifting device to another location.

It is also possible to utilize the lifting device of the present application to initially place cell-type filter cartridges in the operating position prior to being enclosed within an enclosure, in order to reduce contaminates that might come into contact with the filter surface.

When moving a used cell-type disk filter cartridge for disposal in a disposal apparatus (not shown) such as, for example, a drum, an operator would move the used cell-type filter cartridge or cartridges connected to the lifting device to the vicinity of a bin, drum or bag having inner dimensions slightly larger than the particular cell-type filter cartridge being disposed. The operator slowly descends the lifting device having the used cell-type filter cartridge attached thereto, taking care to slide the slanting bottom portion 80 of the three gripping members 16, 18, 20 into a position surrounding the drum, bin or bag. Just before the weight of the device is transferred to the drum, bin or bag, the locking means 60 or the spring return is disengaged in order to allow the lifting device 14 to automatically move to the open position such that the three gripping members 16, 18, 20 rotate outwardly away from contact with the cartridge thereby allowing the cell-type filter cartridges to drop down into the drum, bin or bag. After the cartridge has released and the lifting device has reached its open position, the lifting device is available for moving or removing other cartridges.

Figures 3, 4:
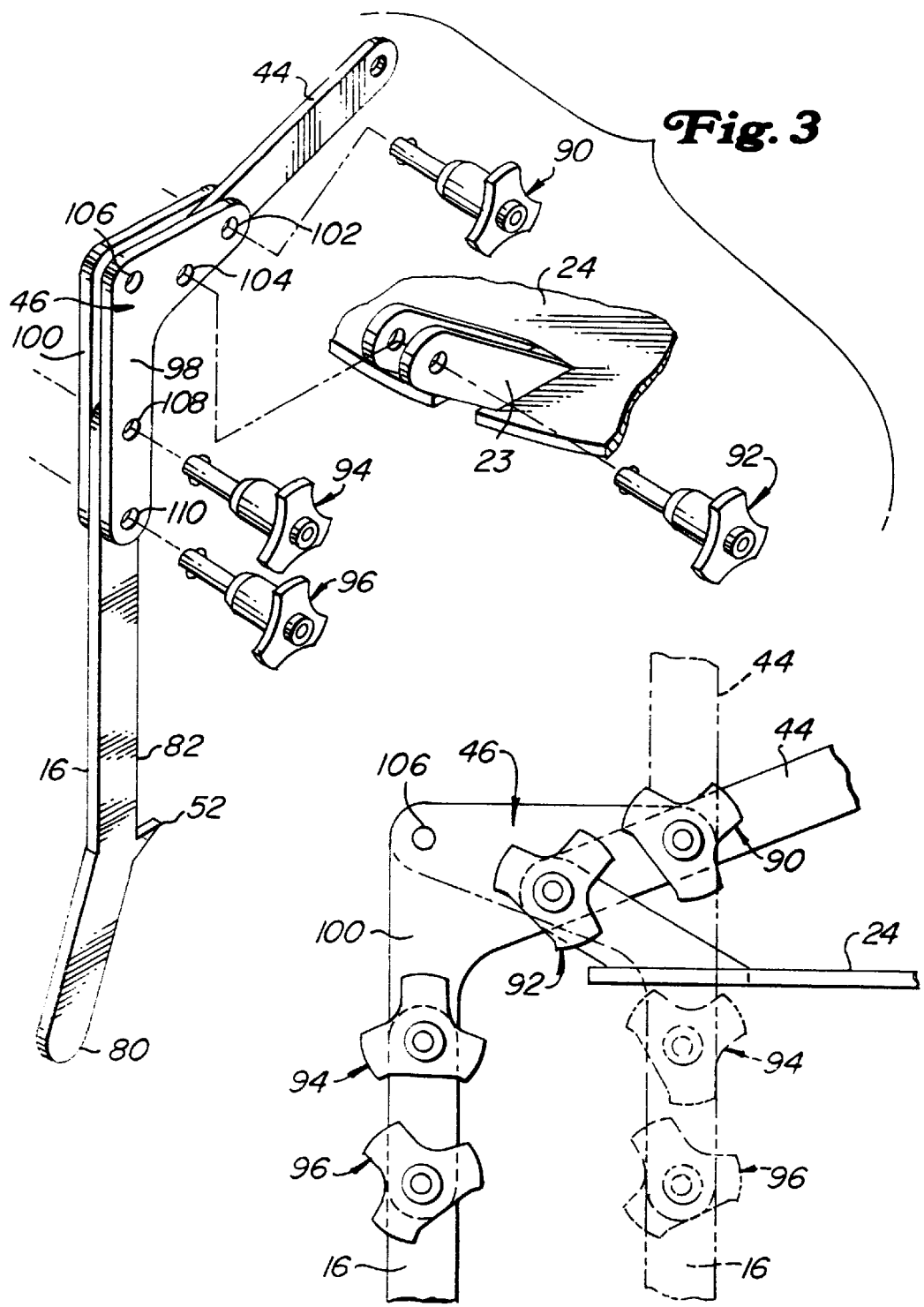
FIG. 3 is a partial perspective exploded view of a portion of the device of FIG. 1.
FIG. 4 is a plan view of the connecting means showing alternative arrangements for a sixteen-inch-diameter cell type cartridge or disk stack.

An important feature of the present application is the ability to readily convert the device from use from one size cartridge to another size cartridge, such as, for example, from use with sixteen (16) inch diameter cell-type filter cartridges to use with twelve (12) inch diameter cell-type filter cartridges and vice versa without any tools by quickly changing the position of the angled linking member 46 relative to the structural member 24. This conversion can be accomplished by using quick disposal safety axes, such as, for example, those manufactured by Erwin Halder KG, Achstetten-Bronnen, Germany, in the connections between the gripping members 16, 18, 20 and the angled linking member 46, the connection between the second linking member 44, the angled linking member 46 and the connecting members 23, 25, 27 and the connections between the second linking member 44 and the angled linking member 46, as shown in FIGS. 1, 3 and 4.

As shown, the conversion from a twelve (12) inch diameter lifting device (FIG. 1) to a sixteen (16) inch diameter lifting device (FIGS. 3 and 4) is accomplished by removing the four connecting means 90, 92, 94, 96, presently preferably quick disposal safety axes, connecting the second linking member 44 and the gripping members 16, 18, 20 to the angled linking member 46, respectively. As shown, two (2) essentially identical members 98, 100 comprise one angled linking member 46, it being understood that the angled linking member could comprise a single member. Each angled linking member piece 98, 100 has at least five (5) apertures 102, 104, 106, 108, 110 formed therein. The angle between the portion of each member 98, 100 having apertures 104, 102 and the portion having apertures 108, 110 is, presently preferably, about one hundred ten (110) degrees, but the angle could be more or less than the preferred one hundred ten (110) degrees and such conversion could still be made.

As shown in FIG. 1, for the twelve (12) inch diameter lifting device 14, connecting means 90, 92 connecting the second linking member 44 to the two angled linking member pieces 98, 100 are connected to apertures 104 106 with the gripping members 16, 18, 20 being connected to apertures 108, 110. As shown in FIGS. 3 and 4, for the sixteen (16) inch diameter lifting device 14, connecting means 90, 92 connecting the second linking member 44 to the two angled linking member pieces 98, 100 are connected to apertures 102, 104 with the gripping member 16, 18, 20 being connected to apertures 108, 110. As shown in FIGS. 1, 3 and 4, in both illustrated configurations, each of the top structural member connecting means 23, 25, 27 is connected to each angled linking member 46 via aperture 104. In the sixteen (16) inch configuration, the second linking member 44 is connected to the aperture 102 as well as aperture 104 with the other connections remaining the same. As should be evident, in order to effectuate such conversion from the twelve (12) inch to the sixteen (16) inch diameter configuration, it is necessary to reverse the orientation of the angled linking member 46 such that the position of aperture 102 relative to aperture 106 is reversed from that shown in FIG. 2. In the sixteen (16) inch diameter configuration, aperture 102 is used to connect the angled linking member 46 to the second linking member 44, as shown in FIGS. 3 and 4. Once this alternate connection has been made and the gripping members 16, 18, 20 are reconnected to the angled connecting member 46, as shown in FIG. 3, the lifting device 14 is now prepared for the lifting and transporting of a sixteen (16) inch diameter cell-type filter cartridge.

With the sixteen (16) inch configuration, the gripping members 16, 18, 20, when in the contact with the cell-type filter cartridge, extend from a position outside the outer periphery of the top structural member 24 whereas, with the twelve (12) inch configuration, as shown in FIG. 1, the gripping members extend downwardly from a position inside the outer periphery of the top structural member 24.

It is understood that the shape and the diameter of the cartridges are not limited to circular, twelve (12) and sixteen (16) inch diameter cartridges and that other sizes and shapes are contemplated by the present invention.

It should be clear that the systems, including the lifting device of the present application, and the methods have met the objectives of the application. Specifically, the systems, including a lifting device, and methods provide for easy, safe and effective handling of unused and used disk stacks, such as cell-type filter cartridges, used in filtration operations including, but not limited to, the use of the lifting device to initially place unused and remove used cartridges from their operative position in a housing after the housing enclosure has been removed; provide for the avoidance of manual lifting and transporting of the disk stacks; have eliminated or at least minimized direct contact between an operator and the cell-type disk stacks in order to minimize operator contact with possible dangerous or toxic substances and minimizing contaminating the environment of the filter housing with slippery, toxic or dangerous materials that may have collected on the outer surfaces of the cell-type filter disk; have eliminated or at least minimized any heavy lifting required by an operator; have endeavored to reduce the overall time required to change cell-type filter cartridges and thereby reduce the down time attributable thereto; have eliminated the requirement for operators to transport or move the cell-type filter disk up or down stairs and have facilitated the placement of used cell-type filter cartridges in waste enclosures.

While the systems and methods for using the systems contained herein constitute preferred embodiments of the invention, it is to be understood that the invention is not limited to these precise systems and methods, and that changes may be made therein without departing from the scope of the invention which is defined in the appended claims.

What is claimed is:

1. An apparatus for handling disk stacks, the apparatus comprising:

a structural member including a central guide bore and at least three structural member connecting means operatively connected thereto;

a central guide member, operatively positioned relative to the central guide bore of the structural member and operatively connected thereto;

a ring member, operatively positioned on the central guide member, and having at least three connecting members operatively connected thereto;

at least three linking means, operatively connected to each of the structural member connecting means and to each of the ring member connecting means, for providing movement of the ring member relative to the structural member;

at least three gripping members, operatively connected to each of the linking means and to each of the structural member connecting means, for interacting with at least one disk stack; and a locking device, operatively connected to the ring member, for locking the apparatus in the open and the closed positions.

2. The apparatus of claim 1 further comprising:

means, operatively connected to the ring member, for operatively connecting a force producing means thereto such that, upon the exertion of a force on the ring member away from the structural member, the ring member moves away from the structural member.

3. The apparatus of claim 1 wherein each gripping member further comprises:

protrusion means, operatively positioned on the surface of the gripping member most proximate the disk stack to be lifted, for engaging a peripheral edge of the disk stack so as to support the weight of the disk stack at least partially thereon.

4. A system for lifting and transporting disk stacks comprising:

a structural member including a central guide bore and at least three structural member connecting means operatively positioned about the outer periphery thereof;

a central guide member, operatively positioned relative to the central guide bore of the structural member and operatively connected thereto;

a ring member, operatively positioned relative the central guide member, and having at least three connecting members operatively positioned thereon;

linking means, operatively connected to each of the structural member connecting means and to each of the ring member connecting means, for providing movement of the ring member relative to the structural member;

a gripping member, operatively connected to each linking means and to each of the structural member connecting means, for interacting with at least one disk stack;

means, operatively connected to the ring member, for vertically raising the lifting system such that at least one disk stack is transported to another position; and position locking means operatively connected to the ring member, for holding the relative position of the ring member and the guide member constant.

5. The system of claim 4 further comprising:

means, operatively connected to the ring member, for operatively connecting a force producing means thereto such that, upon the exertion of a force on the ring member away from the structural member, the ring member moves away from the structural member.

6. The system of claim 4 wherein each gripping member further comprises:

protrusion means, operatively positioned on the surface of the gripping member most proximate the disk stack to be lifted, for engaging a peripheral edge of the disk stack so as to support the weight of the disk stack at least partially thereon.

7. The system of claim 4 wherein the vertically raising means comprises:

a motor powered hoist.

8. The system of claim 4 wherein the vertically raising means comprises:

manual handles.

9. A method for lifting disk stacks from an initial position and transporting the disk stacks to a remote location, the method comprising the steps of:

providing at least one disk to be moved;

operatively connecting a lifting device to the at least one disk, the lifting device comprising:

a structural member including a central guide bore and at least three structural member connecting means operatively positioned about the outer periphery thereof;

a central guide member, operatively positioned relative to the central guide bore of the structural member and operatively connected thereto;

a ring member, operatively positioned on the central guide member, and having at least three connecting members operatively positioned thereon;

linking means, operatively connected to each of the structural member connecting means and to each of the ring member connecting means, for moving the ring member relative to the structural member;

position locking means operatively connected to the ring member, for holding the relative position of the ring member and the guide member constant; and a gripping member, operatively connected to each linking means, for interacting with at least one disk stack;

providing means for engaging the disk with the gripping members;

vertically raising the at least one disk stack;

locking the apparatus in closed positions; and relocating the at least one disk stack from an initial position to another position.

10. An apparatus for handling disk stacks, the apparatus comprising:

a structural member including a central guide bore and at least three structural member connecting means operatively connected thereto;

a central guide member, operatively positioned relative to the central guide bore of the structural member and operatively connected thereto;

a ring member, operatively positioned on the central guide member, and having at least three connecting members operatively connected thereto;

at least three linking means, operatively connected to each of the structural member connecting means and to each of the ring member connecting means, for providing movement of the ring member relative to the structural member, wherein each linking means further comprises:

at least one elongated member operatively connected to each ring member connecting member at one end;

at least a second elongated member operatively connected to the at least one elongated member at one end and;

at least one angled member operatively connected to the third elongated member and to the structural member connecting means; and at least three gripping members, operatively connected to each of the linking means and to each of the structural member connecting means, for interacting with at least one disk stack.

11. The apparatus of claim 10 further comprising:

means, operatively connecting the gripping members and the angled member, the second elongated member and the angled member and the connecting members and the connections between the second elongated member and the angled member, for readily converting the apparatus from use as a first size cartridge to at least another size cartridge.

12. The apparatus of claim 11 wherein, the converting means comprises:

quick disposal safety axes.

13. The apparatus of claim 12 wherein, the quick disposal safety axes enable the ready switch from sixteen (16) inch diameter cell-type filter cartridges to use with twelve (12) inch diameter cell-type filter cartridges and vice versa.

14. The apparatus of claim 13 wherein, the switch is accomplished without any tools by quickly changing the position of the angled member relative to the structural member.

15. A method of converting the apparatus of claim 12 from one size to another size, comprising the steps of:

removing the connecting means connecting the second elongated member and the gripping members to the angled member, respectively; and removing the connecting means connecting the second elongated member and the gripping members to the angled member, respectively.

16. The apparatus of claim 11 wherein when converting from the twelve (12) inch to the sixteen (16) inch diameter configuration, the orientation of the angled member is reversed from that of the twelve (12) inch configuration.

17. The apparatus of claim 11 wherein when converting from the sixteen (16) inch to the twelve (12) inch diameter configuration, the orientation of the angled member is reversed from that of the sixteen (16) inch configuration.

18. The apparatus of claim 11 wherein when in the sixteen (16) inch configuration, the gripping members, when in the contact with the cell-type filter cartridge, extend from a position outside the outer periphery of the top structural member.

19. The apparatus of claim 11 wherein when in the twelve (12) inch configuration, the gripping members, when in the contact with the cell-type filter cartridge, extend downwardly from a position inside the outer periphery of the top structural member.

20. The apparatus of claim 10 wherein the angled member further comprises:

at least five (5) apertures operatively formed therein.

21. The apparatus of claim 10 wherein the angled member further comprises:
- at least two portions, the angle between the two portions having being about one hundred ten (110) degrees.

22. An apparatus for handling disk stacks, the apparatus comprising:
- a structural member including a central guide bore and at least three structural member connecting means operatively connected thereto;
- a central guide member, operatively positioned relative to the central guide bore of the structural member and operatively connected thereto;
- a ring member, operatively positioned on the central guide member, and having at least three connecting members operatively connected thereto;
- at least three linking means, operatively connected to each of the structural member connecting means and to each of the ring member connecting means, for providing movement of the ring member relative to the structural member, wherein each linking means further comprises:
  - at least two elongated linking members and at least one angled linking member, wherein the two elongated linking members are operatively connected to the ring member connecting member at one end and to the second elongated linking member at the other end, the second end of the third linking member is operatively connected to the angled linking member with the angled linking member being operatively connected to the structural member connecting means; and
- at least three gripping members, operatively connected to each of the linking means and to each of the structural member connecting means, for interacting with at least one disk stack such that at least one disk stack is transported from a first position to another position.

23. An apparatus for handling disk stacks, the apparatus comprising:
- a structural member including a central guide bore and at least three structural member connecting means operatively connected thereto wherein each structural member connecting means further comprises:
  - at least two extension members, extending upwardly above the upper surface of the structural member and outwardly beyond the outer periphery of the structural member, the two extension members being separated by a void formed in the upper surface of the structural member, for enabling at least a portion of the linking means to be positioned therein;
- a central guide member, operatively positioned relative to the central guide bore of the structural member and operatively connected thereto;
- a ring member, operatively positioned on the central guide member, and having at least three connecting members operatively connected thereto;
- at least three linking means, operatively connected to each of the structural member connecting means and to each of the ring member connecting means, for providing movement of the ring member relative to the structural member; and
- at least three gripping members, operatively connected to each of the linking means and to each of the structural member connecting means, for interacting with at least one disk stack such that at least one disk stack is transported from a first position to another position.

24. An apparatus for handling disk stacks, the apparatus comprising:
- a structural member including a central guide bore and at least three structural member connecting means operatively connected thereto;
- a central guide member, operatively positioned relative to the central guide bore of the structural member and operatively connected thereto;
- a ring member, operatively positioned on the central guide member, and having at least three connecting members operatively connected thereto wherein each ring member connecting means further comprises:
  - an extension member extending downwardly from the ring member toward the upper surface of the structural member and outwardly beyond the outer periphery of the ring member and including means operatively formed thereon for operatively connecting with the linking means;
- at least three linking means, operatively connected to each of the structural member connecting means and to each of the ring member connecting means, for providing movement of the ring member relative to the structural member; and
- at least three gripping members, operatively connected to each of the linking means and to each of the structural member connecting means, for interacting with at least one disk stack such that at least one disk stack is transported from a first position to another position.

25. A system for lifting and transporting disk stacks comprising:
- a structural member including a central guide bore and at least three structural member connecting means operatively positioned about the outer periphery thereof;
- a central guide member, operatively positioned relative to the central guide bore of the structural member and operatively connected thereto;
- a ring member, operatively positioned relative the central guide member, and having at least three connecting members operatively positioned thereon;
- linking means, operatively connected to each of the structural member connecting means and to each of the ring member connecting means, for providing movement of the ring member relative to the structural member wherein the linking means further comprises:
  - at least two elongated linking members and at least one angled linking member wherein one of the two elongated linking members is operatively connected to the ring member connecting means at one end and to the second elongated linking member at the other end, the second end of the second linking member is operatively connected to the angled linking member with the angled linking member being operatively connected to the structural member connecting means; and
- a gripping member, operatively connected to each linking means and to each of the structural member connecting means, for interacting with at least one disk stack; and
- means, operatively connected to the ring member, for vertically raising the lifting system such that at least one disk stack is transported to another position.

26. A system for lifting and transporting disk stacks comprising:
- a structural member including a central guide bore and at least three structural member connecting means operatively positioned about the outer periphery thereof wherein each structural member connecting means further comprises:
  at least two extension members, extending upwardly above the upper surface of the structural member and outwardly beyond the outer periphery of the structural member, the two extension members being separated by a void formed in the upper surface of the structural member, for positioning at least a portion of the linking means therein;
a central guide member, operatively positioned relative to the central guide bore of the structural member and operatively connected thereto;
a ring member, operatively positioned relative the central guide member, and having at least three connecting members operatively positioned thereon;
linking means, operatively connected to each of the structural member connecting means and to each of the ring member connecting means, for providing movement of the ring member relative to the structural member;
a gripping member, operatively connected to each linking means and to each of the structural member connecting means, for interacting with at least one disk stack; and
means, operatively connected to the ring member, for vertically raising the lifting system such that at least one disk stack is transported to another position.

27. A system for lifting and transporting disk stacks comprising:
a structural member including a central guide bore and at least three structural member connecting means operatively positioned about the outer periphery thereof;
a central guide member, operatively positioned relative to the central guide bore of the structural member and operatively connected thereto;
a ring member, operatively positioned relative the central guide member, and having at least three connecting members operatively positioned thereon wherein each ring member connecting means further comprises:
  at least three extension members, each member extending downwardly toward the upper surface of the structural member and outwardly beyond the outer circumference of the ring member, each extension member including means operatively formed thereon for operatively connecting with the linking means;
linking means, operatively connected to each of the structural member connecting means and to each of the ring member connecting means, for providing movement of the ring member relative to the structural member;
a gripping member, operatively connected to each linking means and to each of the structural member connecting means, for interacting with at least one disk stack; and
means, operatively connected to the ring member, for vertically raising the lifting system such that at least one disk stack is transported to another position.

28. An apparatus for handling disk stacks, the apparatus comprising:
a structural member including a central guide bore and at least three structural member connecting means operatively connected thereto;
a central guide member, operatively positioned relative to the central guide bore of the structural member and operatively connected thereto;
a ring member, operatively positioned on the central guide member, and having at least three connecting members operatively connected thereto;
at least three linking means, operatively connected to each of the structural member connecting means and to each of the ring member connecting means, for providing movement of the ring member relative to the structural member; and
at least three gripping members, operatively connected to each of the linking means and to each of the structural member connecting means, for interacting with at least one disk stack, wherein the weight of the apparatus when operatively connected to a wet disk stack suspended from a hoist is mechanically transformed into a gripping force whereby the gripping force is applied to the wet disk stack by the at least three gripping members.

29. The apparatus of claim 28 wherein the higher the total weight of the disk stack, the stronger the force transferred by the apparatus to the gripping members and ultimately to the disk stack.

30. The apparatus of claim 28 wherein, once the full weight of the disk stack is being supported by the apparatus via the hoist, the apparatus may be locked in its closed position via a locking means operatively positioned on the ring member.

31. The apparatus of claim 30 wherein, once the disk stack has been placed on a supporting surface, in order to release the lifting device from contact therewith, the lifting force on the support ring is reduced to zero force thereby allowing the hoist link to move downward toward the plate out of contact with the connecting means and releases the locking means allowing the support ring to slide downwardly toward the top structural member and to lock in the open position.

* * * * *